United States Patent [19]

Peterson

[11] 4,018,745
[45] Apr. 19, 1977

[54] POLYURETHANE WEAR-RESISTANT SURFACING

[75] Inventor: Robert L. Peterson, St. Paul, Minn.

[73] Assignee: Minnesota Mining and Manufacturing Company, St. Paul, Minn.

[22] Filed: Apr. 22, 1976

[21] Appl. No.: 679,367

Related U.S. Application Data

[63] Continuation of Ser. No. 81,537, Oct. 16, 1970, abandoned.

[52] U.S. Cl. .................. 260/77.5 AT; 260/75 NM; 260/77.5 AN
[51] Int. Cl.[2] ........................................ C08G 18/32
[58] Field of Search ........... 260/77.5 AM, 77.5 AT, 260/77.5 AN, 75 NM

[56] References Cited

UNITED STATES PATENTS

| 3,436,359 | 4/1969 | Hubin et al. .................. 260/830 R |
| 3,668,173 | 6/1972 | Wooster .................... 260/77.5 AM |

OTHER PUBLICATIONS

Saunders et al., *Polyurethanes*, Part II, Interscience, 1964, pp. 456 & 532–535.

*Primary Examiner*—M. J. Welsh
*Attorney, Agent, or Firm*—Cruzan Alexander; Donald M. Sell; Warren R. Bovee

[57] ABSTRACT

A tough wear-resistant elastomer finish coating for flooring and the like is provided comprising a moisture cured reaction product of an aliphatic polyisocyanate capped prepolymer and an unhindered polymeric polyprimary polyamine.

23 Claims, No Drawings

POLYURETHANE WEAR-RESISTANT SURFACING

This is a continuation of application Ser. No. 81,537, filed Oct. 16, 1970, and now abandoned.

This invention relates to a new and useful polyurethane surfacing or coating suitable for use as a finish coating for floors and other areas subject to high wear.

It has long been known to make moisture-curing polyisocyanate terminated prepolymers, long chain polyester or polyalkylene ether polymers, or mixtures thereof, which have been reacted with an excess of organic polyisocyanates so that the polymer chains are terminiated with isocyanate groups. These prepolymers, which are usually solid, or at least too viscous to pour, in their normal state, are customarily applied from solution and are normally packaged in solvent in moisture-proof containers. In use, the solvent carried isocyanate terminated prepolymer is poured, brushed, sprayed or otherwise coated into place and "finished off", by cross linking of the polymer chains, by exposure to the normal moisture in the surrounding atmosphere. To speed up the curing, it is also known to add other curing agents or "driers" such as tertiary amines and the organic compounds of tin, cobalt, iron, manganese, etc. soluble in the prepolymersolvent system.

While it has heretofore been proposed to utilize primary amines as additives to further cross link moisture cured prepolymer coatings, to the best of my knowledge only those which are sterically hindered, e.g. 4,4'-methylene bis-(orthochloroaniline), and similar amines have been found suitable. Such additives have proven markedly beneficial to the resulting moisture cured polyurethane polymer coatings of aromatic diisocyanate terminated prepolymers. But, when such additives are added to moisture curing prepolymers capped with aliphatic diisocyanates, they do not appear to enhance the toughness or wear resistance of the resulting moisture cured coating. Nevertheless, the aliphatic isocyanate capped prepolymers form preferred coatings as the coatings are non-yellowing, damaged sections may be more readily repaired, and they are more elastomeric, and thus, less subject to cracking when used as finish coatings on resilient substrates than the aromatic isocyanate capped prepolymers. However, whether the moisture curing prepolymer is capped with aromatic or aliphatic isocyanates, the addition of unhindered primary polymers has not heretofore been feasible to my knowledge.

I have discovered that certain aliphatic isocyanate capped moisture curing polyurethane cross-linked elastomer forming prepolymers can be greatly benefited by the addition thereto of a minor amount of unhindered polymeric diprimary diamine.

The present invention comprises a moisture curing polyester or polyalkylene ether based aliphatic isocyanate capped prepolymer which has added thereto a small amount of an unhindered polymeric diprimary diamine to assist in "finishing off" (completing the cure) of the elastomer. Moisture cured prepolymers cured with this amine addition appear to be more densely cross linked than those just cured with moisture or cured with moisture in combination with other cure accelerating additives, such as the secondary or tertiary amines sometimes used, or the organic compound metals such as the acid salts of tins, lead, mercury, etc. Howevr, these further additives can be included with the polymeric diprimary diamine, if desired, for their usual purposes. Thus, for example, the addition of some triethylene diamine has been found to decrease the time it takes for the surface to become nontacky after spraying, pouring, brushing or otherwise placed, while the addition of a material such as dibutyl tin dilaurate also tends to shorten the time required for moisture curing.

The base polymer for the production of the isocyanate terminated prepolymers of this invention may be any of the conventionally used hydroxyl terminated polyesters, polyester-amides, or polyalkylene ether polyols, e.g., dicarboxylic acids such as succinic, maleic, fumaric, glutaric, adipic, pimelic, sebacic, etc., from 3 to 20 carbons in length esterified with suitable glycols, or other polyols such as ethylene glycol, porpylene glycol, butylene glycols, alkylene oxide modified polyols, etc., and polyether polyols derived from 1,2 propylene oxide, butylene oxides, hexamethylene oxide, etc. The polyester, polyesteramide, polyalkylene ether glycol or mixture thereof chosen as the base polymer is generally of a molecular weight of about 450–7500, preferably about 500 to 2000 molecular weight. A preferred base polymer is the 1000 molecular weight polytetrahydrofuran.

With respect to the isocyanates used in the production of the prepolymer useful in the practice of this invention, aliphatic polyisocyanates are preferred. While almost any aliphatic isocyanate will work in providing a prepolymer, many of the known aliphatic polyisocyanates have fairly high levels of toxicity. A preferred isocyanate for reaction with the base polymer is methylene bis (4,4'-cyclohexylisocyanate), referred to hereinafter as $H_{12}MDI$. Other available aliphatic diisocyanates are hexamethylene diisocyanate, diisocyanate, diisocyanates of dimerized fatty acids such as the "Versamids", produced by General Mills, etc.

Also there can be included in the prepolymer various fillers as well as certain amount of material having a functionally greater than 2 and containing active hydrogens (as determined by the well known Zerewitinoff method) to provide some trifunctionality in the system, e.g. glycerol, trimethylol propane, pentaerythritol, and polyalkylene oxide adducts thereof. The addition of such materials can toughen up the final product.

In the preparation of tough, abrasion and wear resistant surfacing coatings in accordance with this invention the ratio of isocyanate to active hydrogen in the base polymer at least about 1.2:1 and preferably greater than 1.5:1, e.g. 1.5:1 to 2.0:1.

To cooperate in the moisture cure of such a prepolymer there is added to it a water-insoluble polyether polyprimary polyamine resin, such as that described and claimed in U.S. Pat. No. 3,436,359, issued to Allen J. Hubin and Samuel Smith on Apr. 1, 1969, at the time of its application. These polymers range in molecular weights from about 3500 to 10,000 or more and have a primary amino terminal group attached directly to each end of a polyether moiety containing recurring groups of which at least a major portion consists of oxytetramethylene recurring units. One that has been found to be especially suitable is the 10000 molecular weight homopolymer of tetrahydrofuran capped with primary amine end groups.

In the practice of the invention the prepolymer is prepared in a suitable solvent, e.g. cellosolve acetate, xylene, 1,1,1-trichloroethane, to a solids content of approximately 10 to 50%, including fillers and other additives in the prepolymer, for ready application. At the time of use, this solvent mixture is mixed with a small amount of the polymeric diprimary amine in a suitable organic solvent, along with desired curing accelerators, or other additives. Suitable organic solvents for the polymeric diprimary diamine have been found to be the aromatic or aliphatic organic petroleum distillates such as toluene, 1,1,1-trichloroethane, and cyclohexane. The solvent dissolved polymeric diprimary amine is then mixed with the prepolymer. Utilizing the 10,000 molecular weight polytetrahydrofuran diprimary amine, about 1 amine group per each 10 to 200 NCO groups, has been found to be quite suitable to provide an improved coating. Preferred is about 1 amine group for each 20–100 NCO groups. Utilizing lower molecular weight polymeric diprimary amines, lesser amounts could be used and if the application warrants quick setting, greater amounts could be used. In general, the fewer NCO groups per $NH_2$ group, the tougher the product, displaying the greater physical strength and abrasion resistance.

An understanding of the invention will be further aided by consideration of the specific examples following:

EXAMPLE 1

To a ⅜ inch substrate of a cured polyurethane elastomer was added a surfacing coating of the product of this invention.

For convenience, the prepolymer will be hereinafter referred to as "Part A" and the polymeric diprimary diamine additive will be referred to as "Part B".

Part A was prepared as follows:

| Base Polymer | |
|---|---|
| Ingredient | Parts by Weight per 100 Parts |
| Polytetramethylene glycol polymer of approximately 1,000 molecular weight (solid) | 35.3 |
| Propylene oxide adduct of trimethanol propane of approximately 440 molecular weight (liquid) | 3.1 |
| $H_{12}$MDI (solid) | 21.1 |
| Cellosolve acetate (solvent) | 20.6 |
| 100° F. flash point, aromatic petroleum distillate (solvent) | 19.8 |

After drying the solvents (removing any contaminating water), the other ingredients are added thereto, except that only 75% of $H_{12}$MDI is added to the kettle at this time. The solvent mixture is then heated to about 80° C. for approximately 1 hour; the remainder of the $H_{12}$MDI is then added and the cook continued for approximately 1 more hour at 80° C. The resulting liquid is around 700 centipoises at room temperature with and NCO number of approximately 1,000.

The prepolymer solution thus formed is next mixed with fillers, to provide the finished coating with a desired matte finish rather than a gloss and to assist in the moisture cure, there being added silica particles, polyvinyl chloride particles, and a bentonite clay, all mixed with a suitable petroleum distillate. In parts per 100 parts by weight, the filler mixture is listed hereinbelow:

| Filler Mixture | |
|---|---|
| Filler | Weight Parts per 100 (approx.) |
| Silica particles | 7.75 |
| Polyvinyl chloride particles | 6.86 |
| Bentonite clay | .762 |
| Petroleum distillate with 150° F. flash point | 14.25 |
| Petroleum distillate with 100° F. flash point | 70.54 |

Then a mixture of additional solvents is prepared in parts per 100 follows:

| Solvent Mixture | |
|---|---|
| Solvent | Parts by Weight per 100 Parts |
| 100° F. flash point petroleum distillate | 15.4 |
| 150° F. flash point petroleum distillate | 15.4 |
| Cellosolve acetate | 15.4 |
| 1,1,1-Trichloroethane | 53.7 |

In the preparation of Part A, the Filler Mixture has added to it the basic prepolymer mixture and then the additional solvent. The completed Part A therefore contains the following amounts of ingredients.

| Part A | | |
|---|---|---|
| Ingredient | Units by Weight | % of Total Weight |
| Prepolymer | 1580 | 23.2 |
| Solvent | 4720 | 69.4 |
| Fillers | 500 | 7.4 |

Part B was prepared by mixing a 10,000 molecular weight polymeric diprimary diamine of polytetrahydrofuran (polytetramethylene oxide) with suitable other additives in solvent in the proportions following:

| Part B | |
|---|---|
| Ingredient | Parts by Weight |
| Polymeric diamine | 580 (50% by weight toluene) |
| Dibutyl tin dilaurate (NCO—$H_2$O catalyst) | 35 |
| Triethylene diamine (cure accelerator) | 35 |
| Solvent mixture of 100° F., 150° F. flash point, petroleum distillates and cellosolve acetate in approximately equal quantities relative to one another | 6840 |

Part A and Part B were mixed just prior to application of the system to a surface by mixing Part A and Part B in approximately equal weight amounts, to provide a reaction mixture of about 1 $NH_2$ group for each 30 NCO groups. The mixture was then roller coated on the surface to be covered, namely a polyalkylene ether polyol based urethane elastomer flooring. The flooring was about ⅜ inch thick and the finish coating comprised of the reaction mixture of Part A and Part B was applied to a thickness of about 4 mils. The resulting matte finished surfacing was extremely tough, resisting abrasion and wear in a very high traffic area at a gymnasium entrance, the gymnasium being used for multipurpose athletic events, as an auditorium, and as a general meeting hall.

After application to the surface of the coating, approximately three days were allowed for final curing.

EXAMPLE 2

A comparison was made between moisture cured systems containing 4,4' methylene bis-(orthochloroaniline) and the 10,000 m.w. diprimary diamine of polytetrahydrofuran. The formulations were similar to that of Example 1, except that polytetramethylene glycol of the base polymer was replaced with polycaprolactone and the triethylene diamine was omitted from Part B.

The wearability of the resulting surfaces was measured with a Taber abraser using an H22 wheel with a 1 kg. load, with the results following:

| Amine | Grams Loss per 200 Cycles |
|---|---|
| Diprimary diamine containing coating | .02 |
| 4,4'-methylene bis-(orthochloroaniline) | .14 |

Thus, about a 7 to 1 improvement in wearability is obtained with the polymeric diamine. In gymnasium and other surfaces, much greater cut resistance to spiked heels and caster wheels such as those used in portable bleachers, also is obtained.

Further, solvent resistance studies show decreased swelling in the diprimary diamine containing moisture cured products with greatly improved resistance to soil retention as compared with those cured in the absence of the diprimary diamines.

That which is claimed is:

1. A tough, wear-resistant elastomer coating comprising the moisture-cured reaction product of a reaction mixture comprising
   a. an aliphatic polyisocyanate-terminated prepolymer, and
   b. a polymeric polyprimary amine having a molecular weight of at least 3,500, the relative amounts of said prepolymer and said polyamine in the reaction mixture being sufficient to provide about one amine group for each 10 to 200 isocyanate groups.

2. The elastomer coating of claim 1 wherein said prepolymer is derived at least in part from a polyester polyol.

3. The elastomer coating of claim 2 wherein said polyester is polycaprolactone.

4. The elastomer coating of claim 1 wherein said prepolymer is derived at least in part from a polyether polyol.

5. The elastomer coating of claim 4 wherein said polyether polyol is a polyalkylene ether polyol.

6. The elastomer coating of claim 1 wherein said prepolymer is derived at least in part from a polyol comprising polytetrahydrofuran.

7. An elastomer coating according to claim 1 wherein said polyisocyanate terminated prepolymer has a molecular weight of about 450 to 2500.

8. An elastomer coating according to claim 1 wherein said aliphatic polyisocyanate is methylene bis(4,4'-cyclohexyl isocyanate).

9. An elastomer coating according to claim 1 wherein said polymeric polyprimary amine is a polyether polyprimary amine.

10. An elastomer coating according to claim 9 wherein said polyamine has a molecular weight of at least 3500 and has a primary amino terminal group attached directly to each end of a polyether moiety containing recurring groups of which at least a major portion consists of oxytetramethylene recurring units.

11. An elastomer coating according to claim 10 wherein said polyamine is a homopolymer of tetrahydrofuran capped with primary amine end groups and having a molecular weight of about 10,000.

12. An elastomer coating according to claim 1 wherein said polyamine is a water insoluble polyether polyamine having a molecular weight of at least 3500 and having a primary amino terminal group attached directly to each end of a polyether moiety containing recurring groups of which at least a major portion consists of oxytetramethylene recurring units and at most a minor portion consists of another oxyalkylene or thioalkylene recurring units having from 2 to 6 straight chain carbon atoms, at least half of said primary amino terminal groups having the structure—$OC_4H_3NH_2$, said polyether moiety having less than about 3 percent by weight of secondary amino nitrogen atoms and less than about 0.3 percent by weight of tertiary amino nitrogen atoms in its essentially linear chain.

13. An elastomer coating according to claim 1 wherein the amounts of said prepolymer and said polyamine in the reaction mixture is sufficient to provide about one amine group for each 20 to 200 isocyanate groups.

14. An elastomer coating according to claim 1 additionally comprising
   c. a cure accelerating additive.

15. An elastomer coating according to claim 14 wherein said cure accelerating additive is dibutyl tin dilaurate.

16. A method of making a tough, wear-resistant elastomer coating comprising mixing a first reaction mixture with a second reaction mixture prior to applying said mixture to a substrate in the presence of moisture, said first reaction mixture comprising an aliphatic polyisocyanate terminated prepolymer and said second reaction mixture comprising a polyether polyprimary polyamine having a molecular weight of at least 3500, the relative amounts of said first and second reaction mixtures being sufficient to provide about one amine group for each 10 to 200 isocyanate groups.

17. A method according to claim 16 wherein each of said first and second reaction mixtures includes an independently selected solvent.

18. A two-package coating system for preparing a tough, wear-resistant, moisture-curing elastomer coating comprising a first package containing therein an aliphatic polyisocyanate terminated prepolymer and a second package containing therein a polyether polyprimary polyamine having a molecular weight of at least 3500, the relative amounts of said prepolymer and said polyamine in the separate packages being sufficient to provide about one amine group for each 10 to 200 isocyanate groups when the contents of the packages are mixed.

19. A two-package coating system according to claim 18 wherein each of said packages additionally includes an independently selected solvent.

20. A two-package coating system according to claim 18 wherein said second package contains a cure accelerating additive.

21. A two-package coating system according to claim 20 wherein said cure accelerating additive is dibutyl tin dilaurate.

22. A coated substrate wherein said coating comprises a tough, wear-resistant elastomer coating according to claim 1.

23. A coated substrate according to claim 22 wherein said substrate is an elastomeric material.

* * * * *